United States Patent
Carrez et al.

(10) Patent No.: US 7,152,845 B2
(45) Date of Patent: Dec. 26, 2006

(54) COCK COMPRISING INDEXABLE ROTATING KEY

(75) Inventors: Jean-Luc Carrez, Ecouen (FR); Valery Dalle, Gouvieux (FR); Laurent Lesimple, Paris (FR); Jean-Max Huet, Clichy (FR)

(73) Assignee: Vygon, Ecouen (FR)

( * ) Notice: Subject to any disclaimer, the term of this patent is extended or adjusted under 35 U.S.C. 154(b) by 0 days.

(21) Appl. No.: 10/527,739

(22) PCT Filed: Oct. 3, 2003

(86) PCT No.: PCT/FR03/02910

§ 371 (c)(1),
(2), (4) Date: Apr. 19, 2005

(87) PCT Pub. No.: WO2004/031635

PCT Pub. Date: Apr. 15, 2004

(65) Prior Publication Data

US 2006/0033066 A1   Feb. 16, 2006

(30) Foreign Application Priority Data

Oct. 4, 2002 (FR) .................................. 02 12335

(51) Int. Cl.
  F16K 31/00 (2006.01)
  F16K 5/10 (2006.01)

(52) U.S. Cl. ........................................ 251/297; 251/208
(58) Field of Classification Search ............... 251/287, 251/288, 297, 208, 209, 309, 314
See application file for complete search history.

(56) References Cited

U.S. PATENT DOCUMENTS

| 1,187,788 | A | * | 6/1916 | Smith .......................... 251/209 |
| 1,493,133 | A | * | 5/1924 | Sykora .................. 137/625.47 |
| 3,185,179 | A | * | 5/1965 | Harautuneian ......... 137/625.47 |
| 3,783,900 | A | * | 1/1974 | Waldbillig ............. 137/625.47 |
| 4,073,314 | A | * | 2/1978 | Speelman et al. ..... 137/625.47 |
| 5,443,453 | A | * | 8/1995 | Walker et al. ............... 604/248 |
| 5,832,959 | A | * | 11/1998 | Szymczakowski et al. ...... 137/625.47 |
| 6,164,328 | A | * | 12/2000 | Huber, Jr. ............. 137/599.17 |
| 6,536,742 | B1 | * | 3/2003 | Lotz et al. .................. 251/297 |

* cited by examiner

*Primary Examiner*—Justine R. Yu
*Assistant Examiner*—Andrew J. Rost
(74) *Attorney, Agent, or Firm*—Levine & Mandelbaum

(57) ABSTRACT

A cock has an indexable rotating key. Indexing is achieved by a raised element on a shaped base of a housing of a barrel, and a ring which is formed at the end of the key and which is elastically deformable in a transverse plane. The raised element and ring form stubs and notches which cooperate to determine key blocking positions when the key is being rotated. The cock is suitable for use with medical instruments.

18 Claims, 10 Drawing Sheets

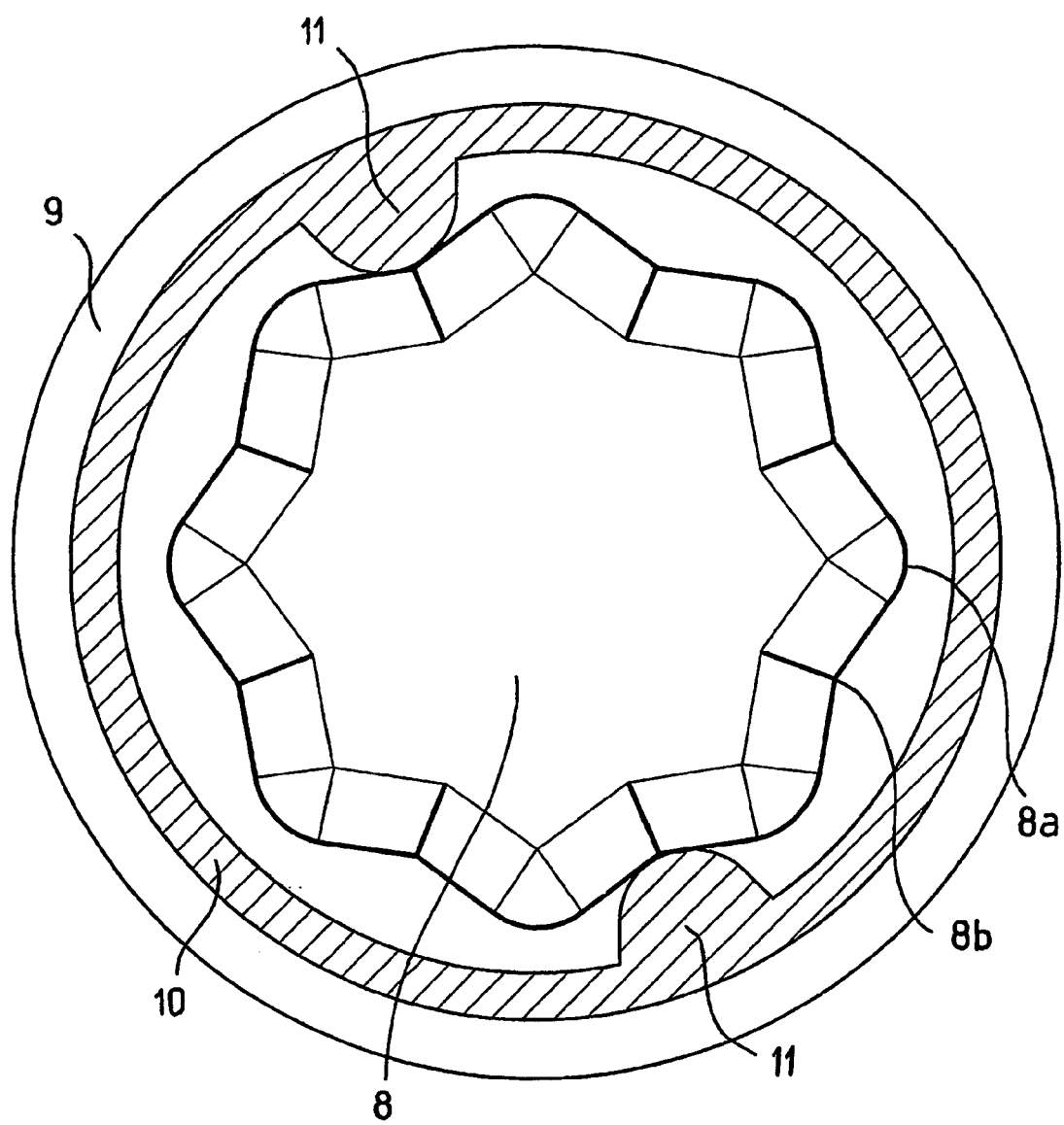
FIG_9

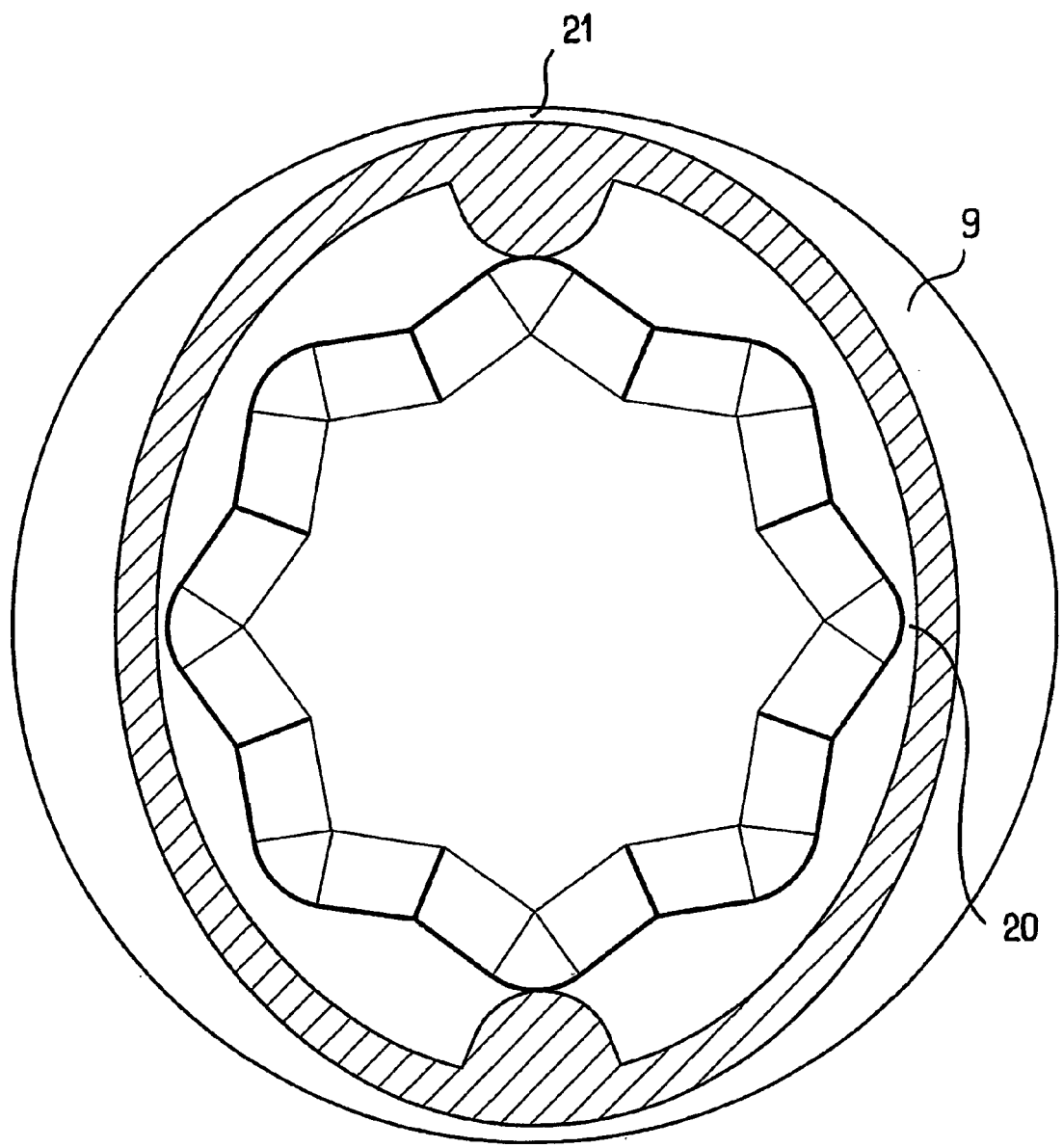
FIG_10

COCK COMPRISING INDEXABLE ROTATING KEY

BACKGROUND OF THE INVENTION

The invention relates to a cock comprising an indexable rotating key.

More specifically, it relates to a cock with a rotating key, the key of which rotates in a tubular housing of a barrel where the key has been axially introduced through one end of the housing up into an axial position determined by blocking means, the sidewall of the housing including passages which open into a housing area through apertures, while the key is designed with passage(s) for blocking these apertures or establishing communication between certain apertures according to the positions of the key during rotation of the key, the cock including in another area of the housing, means (so-called indexing means) for tactilely telling the operator that the key has arrived in a service position where it establishes communication, these indexing means comprising stubs and notches distributed over faces facing the key and the housing so that during a rotation of the key, the stubs penetrate the notches when the key arrives in a service position and they may only emerge therefrom when a substantial force is exerted on the key to rotate it, the key or the barrel being designed so as to allow the stubs to emerge from the notches by an elastic effect resulting from this force.

An example of such a cock is described in U.S. Pat. No. 5,832,959.

In this example, the barrel and the key are both in an elastic material in order to achieve the required elastic effect so that the stubs may emerge from the notches.

Such elasticity is detrimental to the seal of the area into which open the passages of the barrel, all the more so since the indexing means are located in an area of the housing, the internal diameter of which is larger than that of the area into which open passages of the barrel.

US publication 2001/025942 describes a cock, the barrel's housing of which includes a closed base which has a determining raised element between it and the elastic side wall of the housing, an annular groove in which may rotate a ring formed at the end of the key, the stubs and the notches being formed on said raised element and on said ring.

SUMMARY OF THE INVENTION

An object of the invention is to provide a cock with an improved seal and the elasticity of which does not interfere with the seal required in the area of the apertures.

According to the invention, this is achieved with a cock in which the housing includes a closed base which has a raised element which determines between it and the side wall of the housing, an annular ring and the key has at its end, an elastically deformable ring in a plane transverse to the axis of rotation of the key which rotates in this groove, the stubs and notches being formed on said raised element and on said ring, and the area where the indexing means are found, having a reduced diameter relatively to the area into which open the apertures of the passages of the side wall of the barrel's housing.

In one preferred embodiment, said ring is divided into arc sectors which are separated by cuts and in which are formed the stubs or the notches.

The inventive cock may further have one or more of the other following features:

Said ring is divided into two identical sectors each of which including a stub or a notch.

Said ring is divided into four identical sectors each of which including a stub or a notch.

Said raised element is conformed sideways in order to form eight notches or eight stubs.

The area where the indexing means are found, has a reduced diameter relatively to the area into which open said apertures.

The housing of the barrel has a cross-section which decreases from the end for introducing the key and the key has a general frustro-conical shape.

Said raised element has a regular profile consisting of a succession of convex sectors alternating with concave sectors forming said notches.

The key is axially blocked in the housing by the penetration of a circular rib formed on the key in a groove formed in the side wall of the housing.

DESCRIPTION OF THE DRAWINGS

Exemplary embodiments of a cock according to the invention will be described hereafter with reference to the figures of the appended drawing wherein:

FIGS. 9 and 10 are cross-sections of a cock, the key of which has eight blocking positions, in a state where the key is in a blocking position and in an intermediate state between two blocking positions, respectively.

DESCRIPTION OF THE PREFERRED EMBODIMENT

Figure 1:
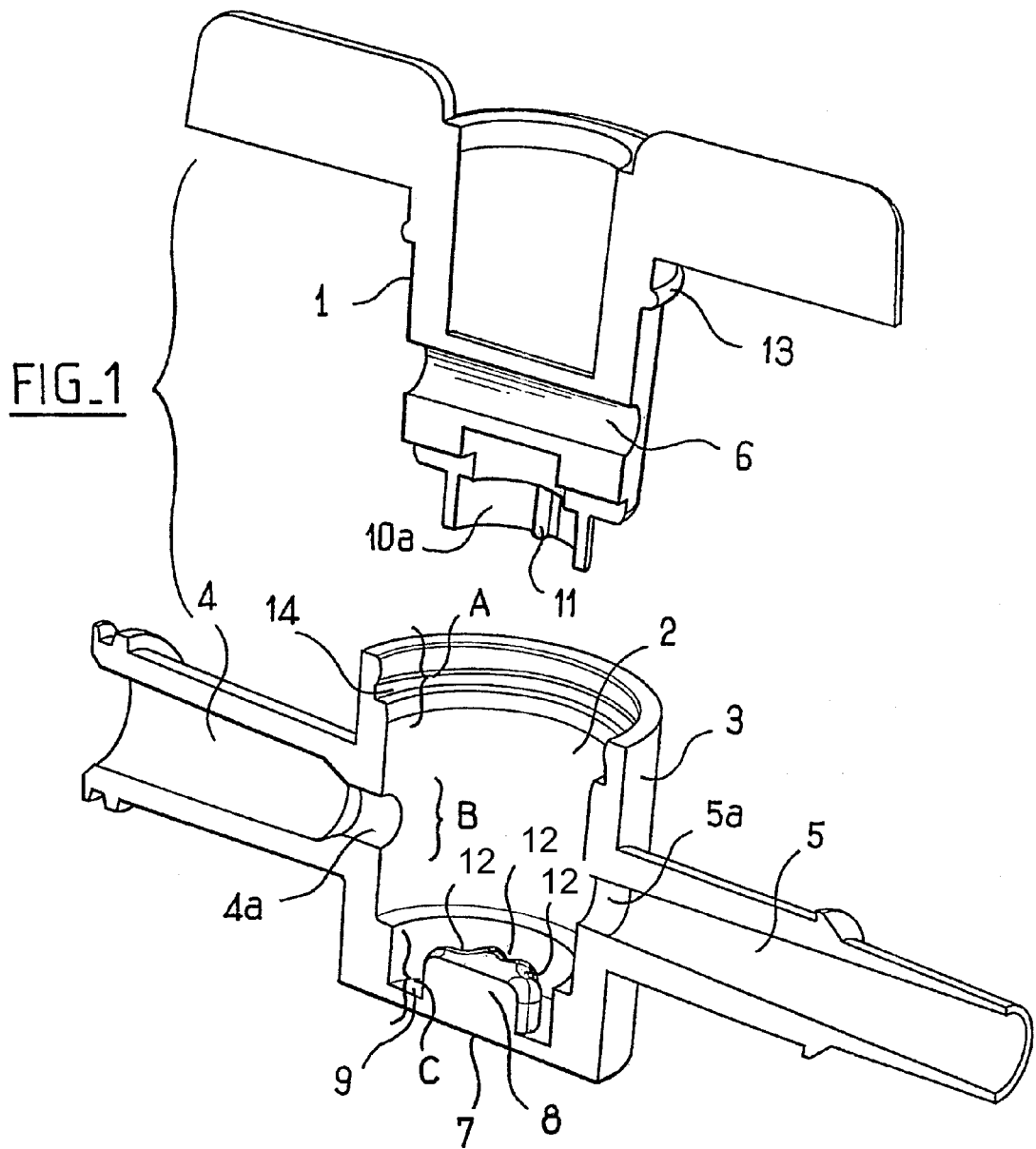
FIG. 1 is a perspective view of the key and the barrel of a cock before introducing the key into the barrel, only one half of the key and the barrel being illustrated in the figure.

FIG. 1 illustrates the key (1) and the barrel (2) of a cock, before introducing the key into the barrel through an end of the housing (3). To simplify the figure, it has been assumed that the barrel only includes two passages (4, 5) which open into the housing through apertures (4a, 5a) and that the key only includes one passage (6) for having said apertures communicate.

According to the invention, the housing (3) of the barrel (2) has a closed base (7) provided with a raised element (8) which determines between it and the side wall of the housing, an annular groove (9), and the key (1) has at its end, a ring (10) able to rotate in said groove when the key is in it axial blocking position.

The profile of the raised element (8) formed on the base of the barrel's housing determines a regular alternation of convex sectors (8a) and concave sectors (8b). The concave sectors (8b) form the notches.

In the illustrated example, the raised element (8) thereby determines eight notches (12).

Figure 2:
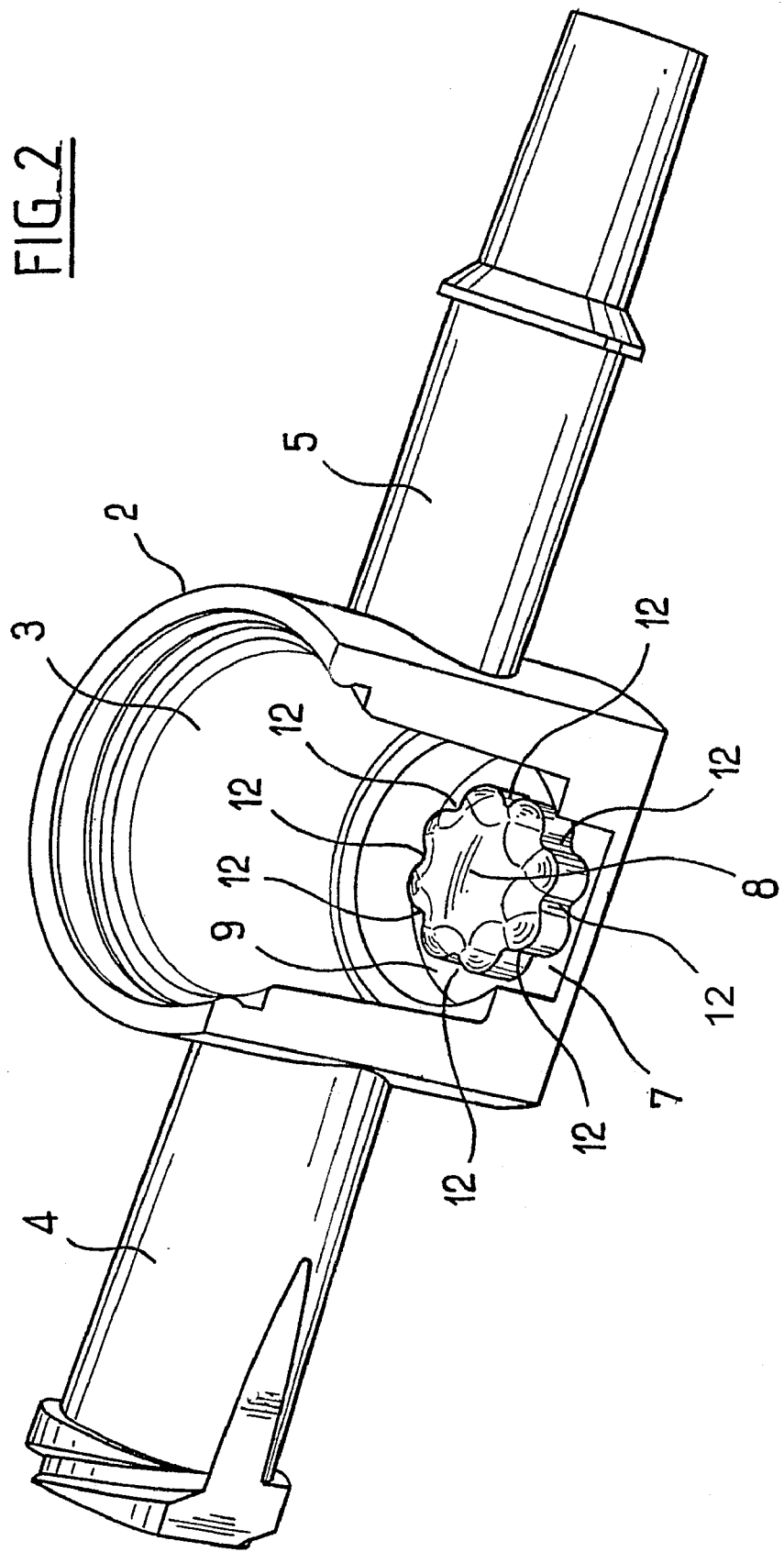
FIG. 2 is a perspective view of the barrel alone, with a cut-out in order to show the whole of the formed raised element on the base of the housing.

The raised element (8) of which only one half appears in FIG. 1 is visible as a whole in FIG. 2.

The ring (10) of the key is formed in this example with two arc-shaped identical sectors (10a, 10b) separated by cuts and each of which has a raised vertical stub (11). Only one sector appears in FIG. 1 but both sectors are visible as a whole in FIG. 3 where the key is illustrated upside down.

Figure 4:
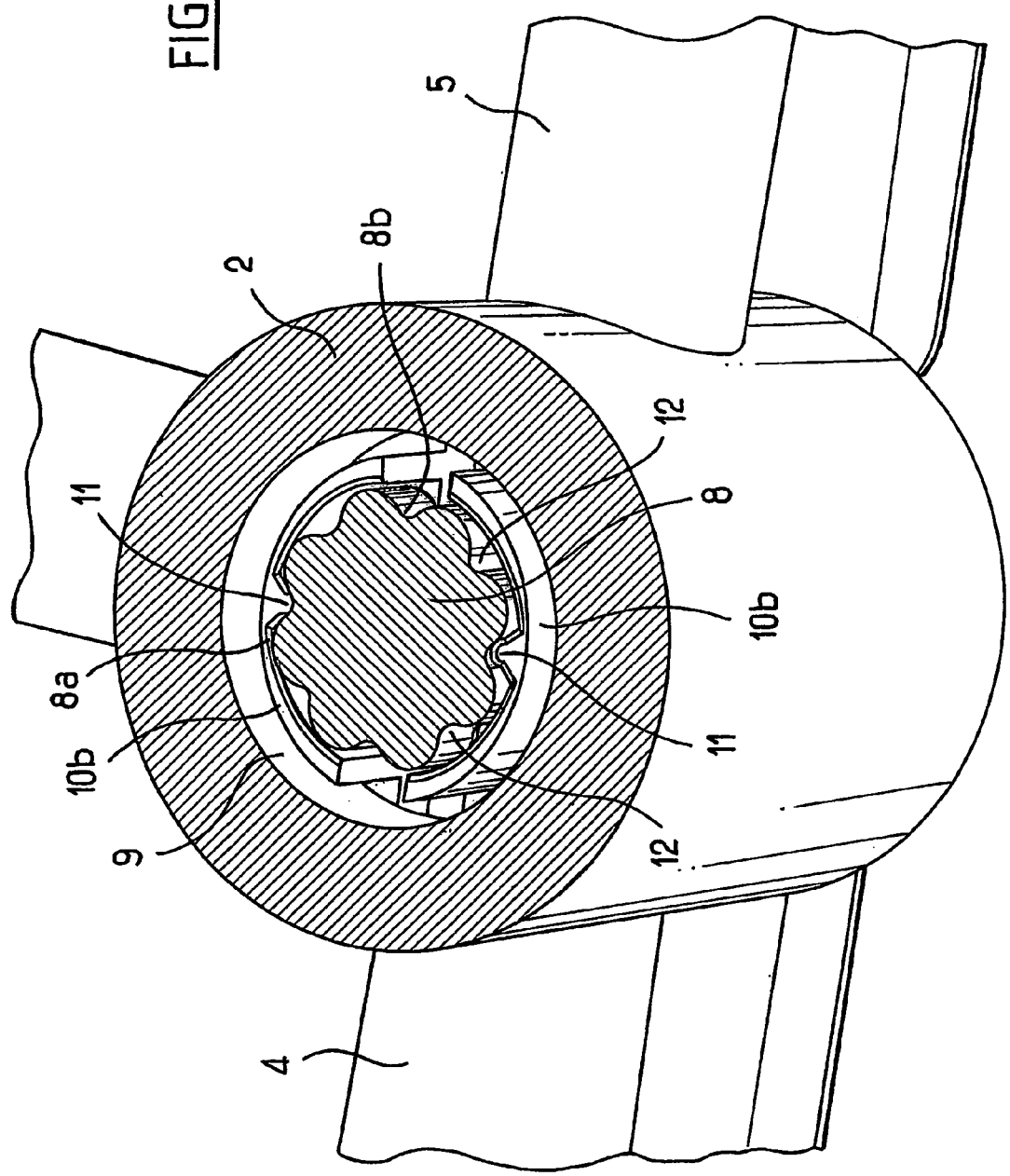
FIG. 4 is a perspective as viewed from below, of a cross-section of the cock in the region of the ring and the raised element.

The interaction of the ring and the raised element is clearly visible in FIG. 4. In this figure, the hatched portions are portions of the barrel.

Figure 3:
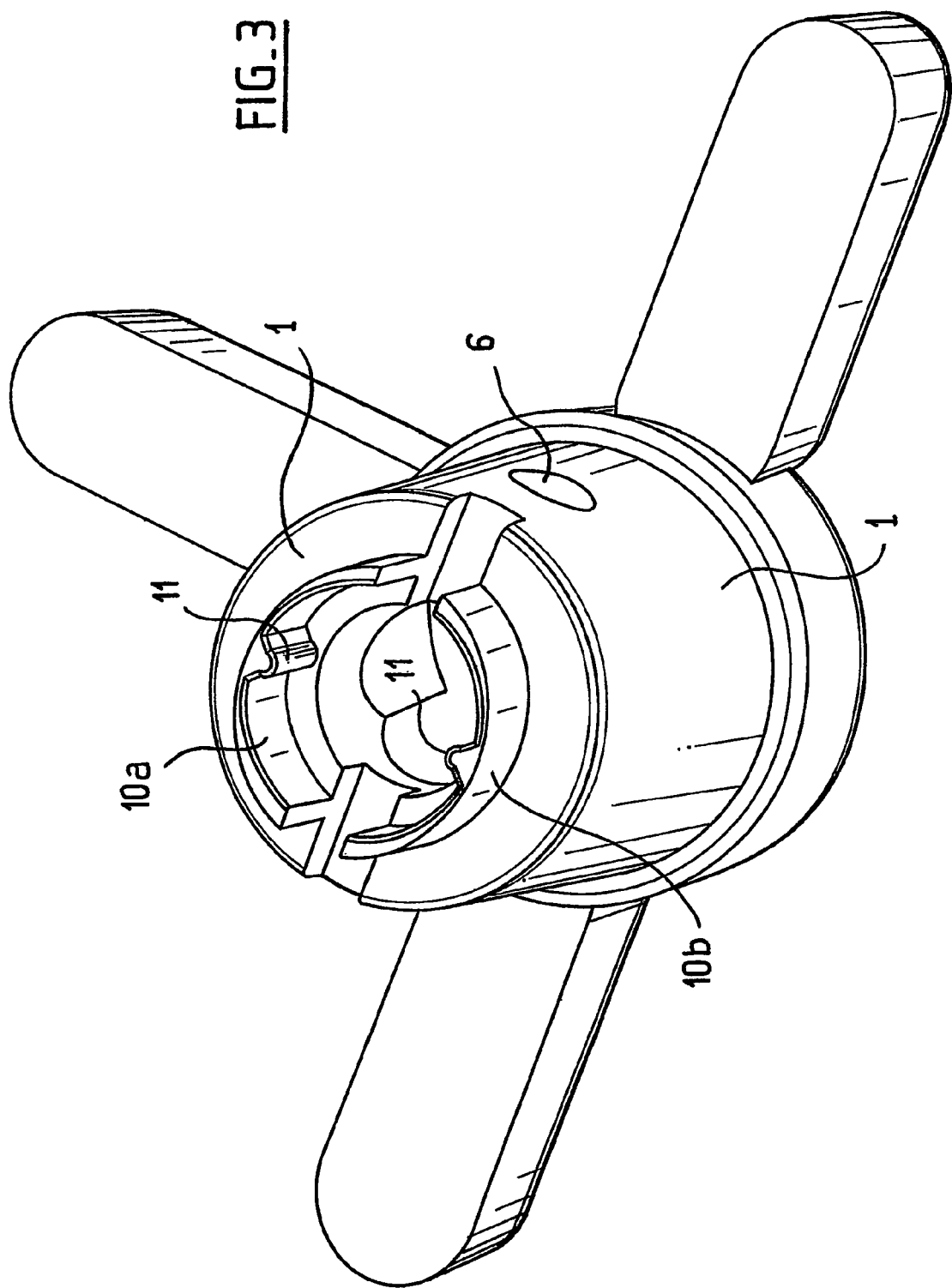
FIG. 3 is a perspective view of the key alone, illustrated upside down so as to show the whole of its ring.
Figure 5:
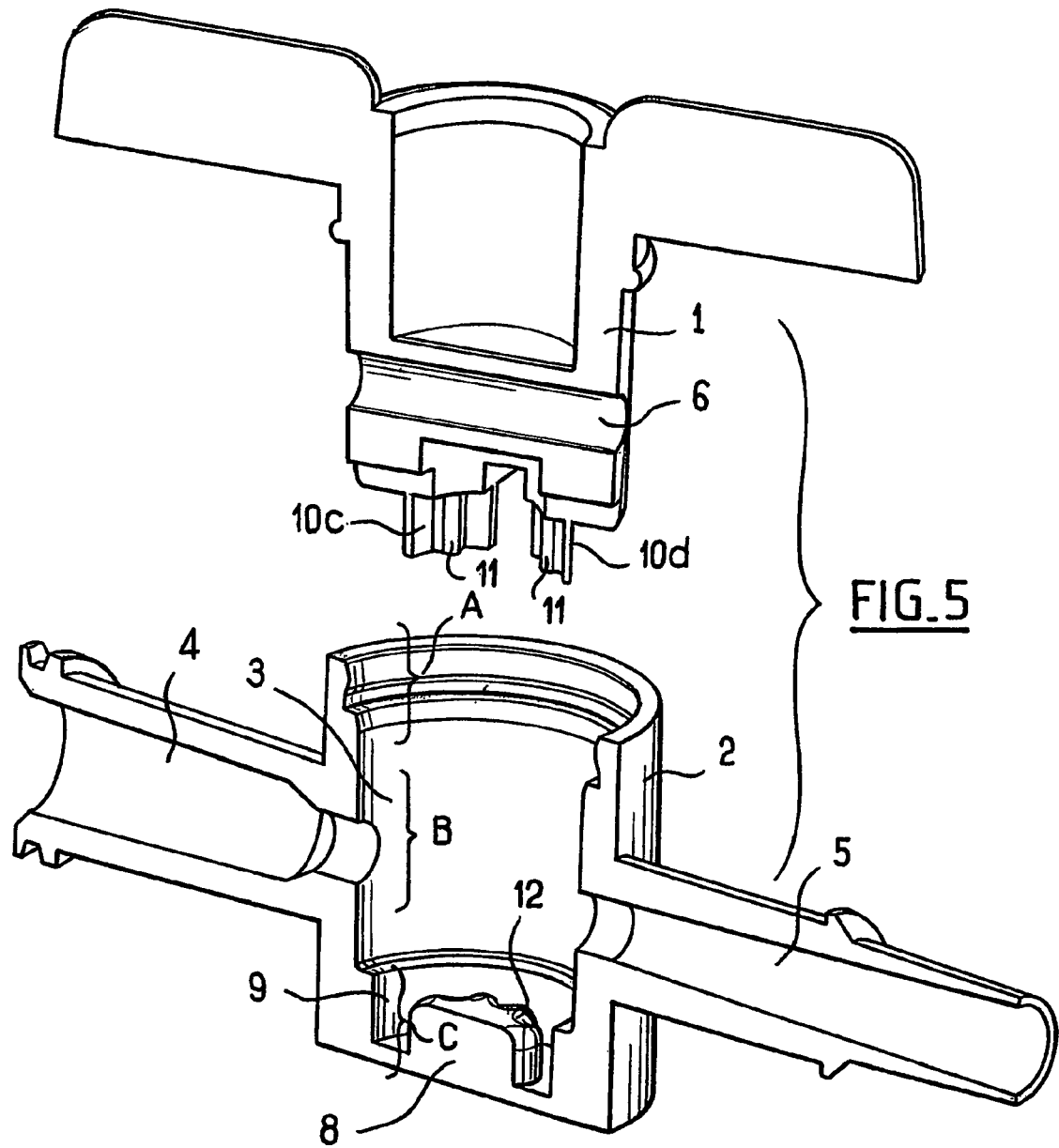
FIGS. 5–7 are views relating to an alternative embodiment of the invention, which correspond to FIGS. 1, 3 and 4, respectively.
Figure 6:
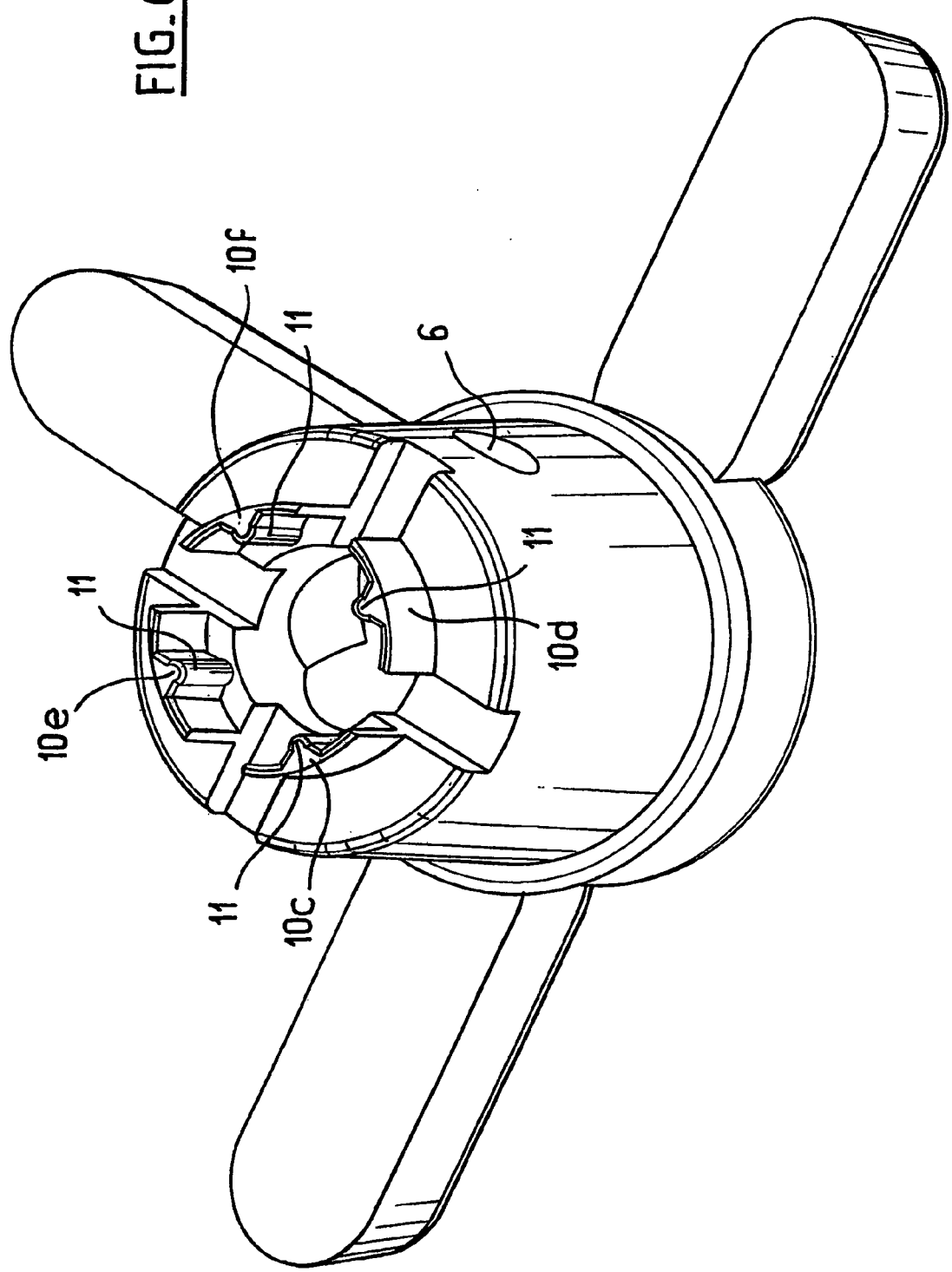
Figure 7:
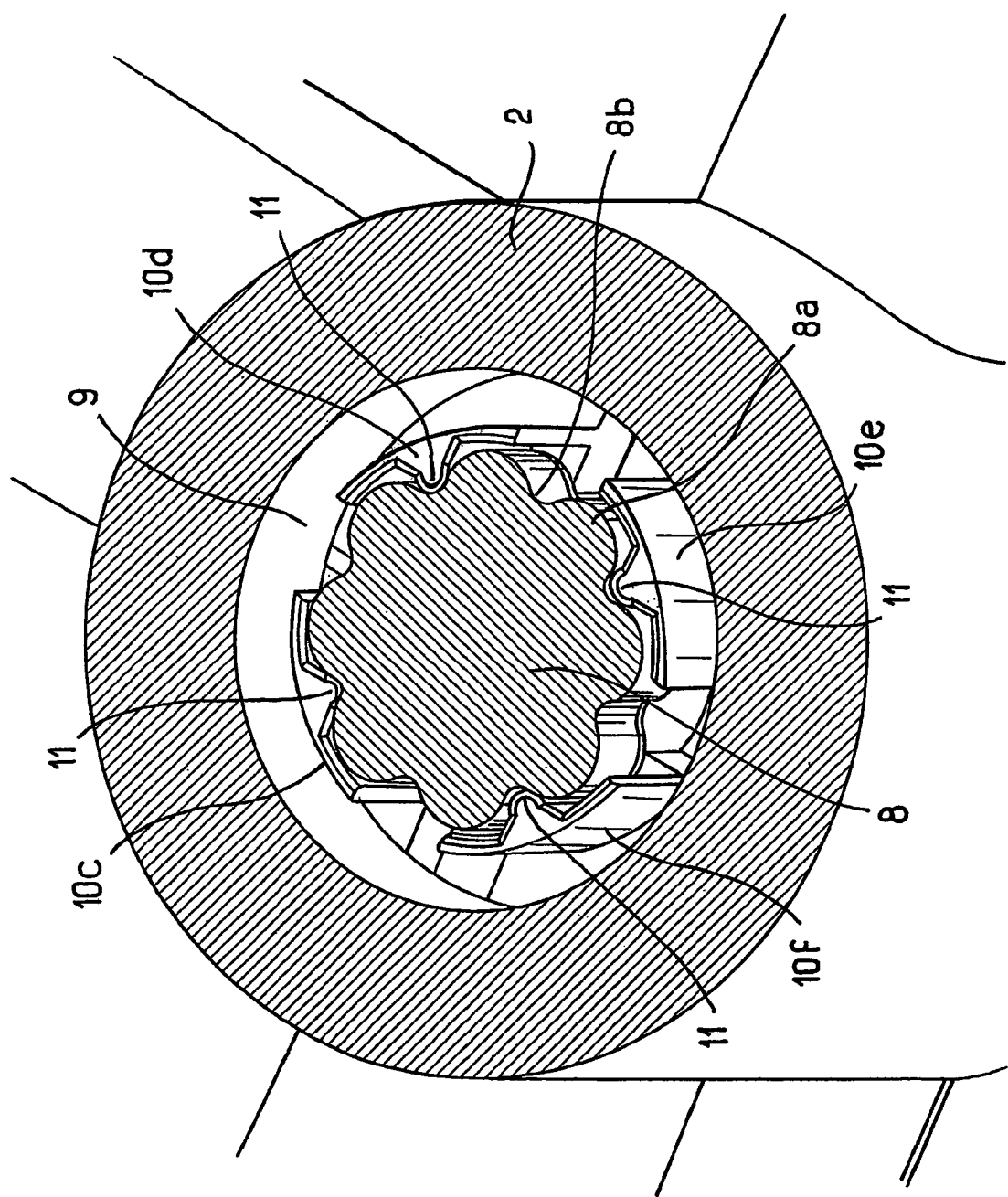

In FIGS. 5–7 which correspond to FIGS. 1, 3 and 4 respectively, an alternative embodiment is illustrated wherein the ring of the key is cut into four arc-shaped separate sectors (10c, 10d, 10e, 10f) each of which bearing a stub. The barrel may be identical with that of the previous embodiment.

The invention is not limited to these exemplary embodiments. It is obvious that the number of sectors of the rings, the number of stubs and the number of notches may vary according to the embodiments.

The effective feel of the indexing may be adjusted by the height of the arcs of the ring, the length of the arcs, the number of arcs, and the height of the raised shape at the base of the housing.

The axial position of the key in the barrel is for example determined as in the illustrated case, by clipping an external annular rib (13) of the key in a groove (14) of the annular wall of the barrel.

In the figures, it is also seen that the area (C) where the indexing means are found, has a reduced diameter relatively to the area (B) into which open the bores of the barrel.

According to a feature of the invention, the clipping areas (A), the communication areas (B) and the indexing areas (C) are arranged in tiers and have cross-sections which decrease from one area to the next.

It is obvious that the invention is not limited to one possibility of communication and that all the usual possibilities of communications may be achieved with a cock according to the invention, by varying the number of passages, in a way known per se.

Figure 8:
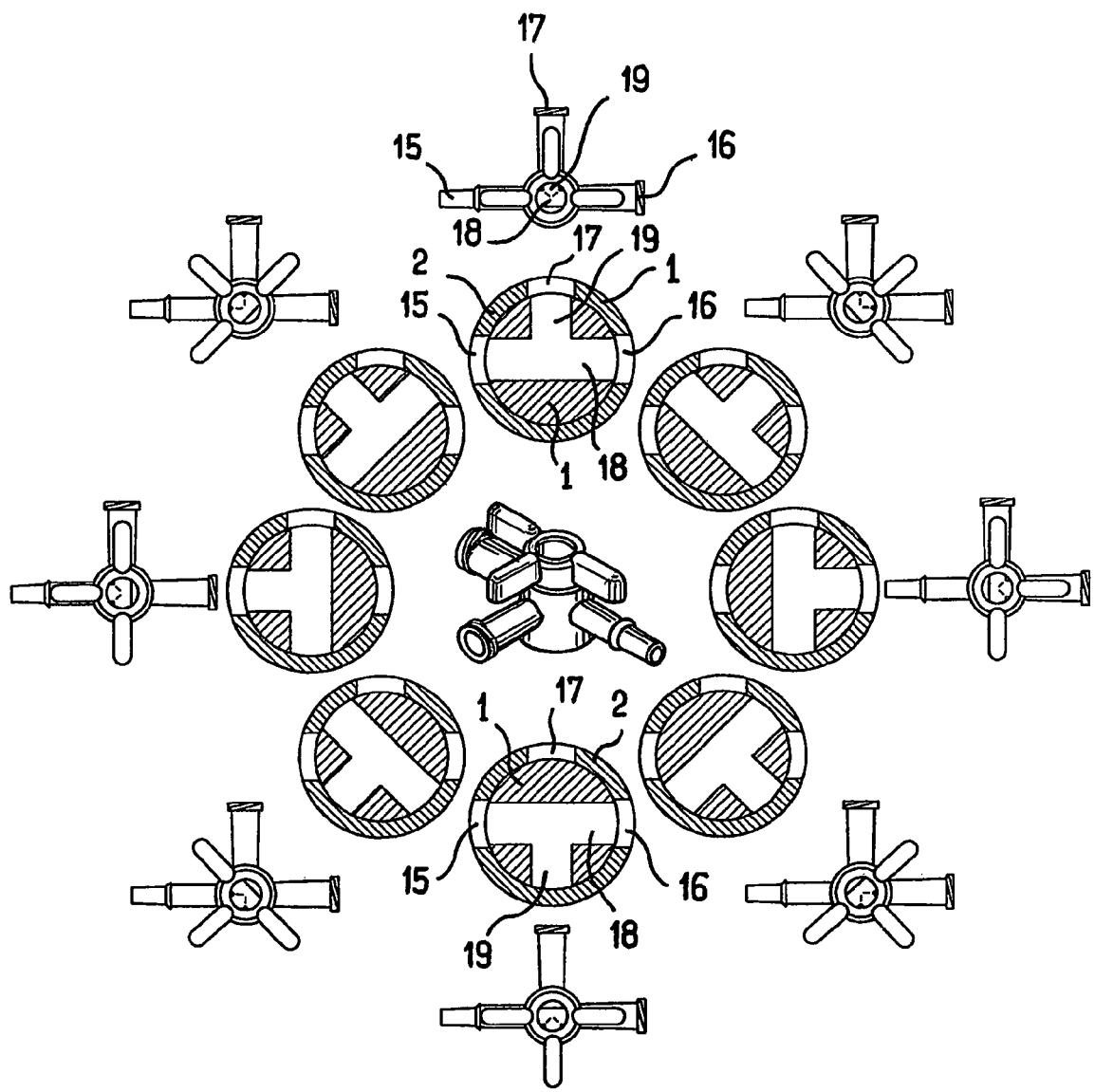
FIG. 8 is a diagram illustrating the communication possibilities, as known per se, of a three-way cock.

As a reminder, a three-way cock with its various communication possibilities is schematized in FIG. 8. The barrel has three passages 15, 16, 17 positioned as a T and the key has two perpendicular passages 18, 19.

A cock which has an octagonal raised element (8) formed on the base wall of the housing of the barrel (21) with its convex portions (8a) and its concave portions (8b), and the tip of the key consisting of a deformable cylindrical ring (10) with a transversely deformable thin wall which forms two diametrically opposite gadroons (11), are illustrated in the diagrams of FIGS. 9 and 10.

In FIG. 9, both gadroons are diametrically brought closer to each other against two opposite concavities of the raised element.

In FIG. 10, where the ring is elastically deformed, because the gadroons are mounted onto the convexities of the raised element, which elastically deforms the wall of the ring of the key according to an ellipse, a play (20) remains between the convexities (8a) of the raised element and the ring (10), and a play (21) remains between the ring (10) and the wall (9) of the barrel's housing, located opposite to each other.

The elastic deformation from a circle to an ellipse of the key provides a spring function for bringing back the gadroons into the areas (8b) while providing exact indexing, even after many uses of the key.

The inventive cock is notably intended to be used in medical apparatuses.

The invention is not limited to the embodiments which have been described as preferred examples.

The invention claimed is:

1. A cock comprising a rotating key, the key of which rotates in a tubular housing of a barrel where the key has been axially introduced through an end of the housing up into an axial position determined by blocking means, the side wall of the housing including passages which open into an area of the housing through apertures while the key is designed with passage(s) for blocking these apertures or establishing a communication between certain apertures according to service positions of the key during a rotation of the key, the cock including in another area of the housing, indexing means in order to tactilely tell the operator that the key has arrived in a service position where it establishes a communication, these indexing means comprising stubs and notches distributed over the faces facing the key and the housing so that during a rotation of the key, the stubs penetrate the notches when the key arrives in a service position and may only emerge therefrom when a substantial force is exerted on the key to rotate it, the key or the barrel being designed in order to allow the stubs to emerge from the notches by an elastic effect resulting from this force, the housing including a closed base which has a raised element determining between it and the side wall of the housing, an annular groove, the key having at its end a ring which rotates in this groove, the stubs and the notches being formed on said raised element and said ring, wherein said ring is elastically deformable in a plane transverse to the axis of rotation of the key, and the area where the indexing means are found, has a reduced diameter relative to the area into which said apertures open.

2. The cock according to claim 1, wherein the area where the indexing means are found has a reduced diameter relative to the area into which said apertures open.

3. The cock according to claim 1, wherein the housing has a cross-section which decreases from said end of the housing, and the key has a substantially frustro-conical shape.

4. The cock according to claim 1, wherein said raised element has a regular profile comprising a succession of convex sectors alternating with concave sectors forming said notches.

5. The cock according to claim 1, wherein the key comprises an annular rib disposed in a groove formed in the side wall of the housing for limiting axial movement between the key and the housing.

6. The cock according to claim 1, wherein the ring has a cross-section which is circular in an undeformed state and which becomes elliptical in an elastically deformed state.

7. The cock according to claim 1, wherein, when the ring is elastically deformed, a play exists between the convexities of the raised element and the ring and a play exists between the ring and the wall of the housing of the barrel which is facing the ring.

8. A cock comprising a rotating key, the key of which rotates in a tubular housing of a barrel where the key has been axially introduced through an end of the housing up into an axial position determined by blocking means, the side wall of the housing including passages which open into an area of the housing through apertures while the key is designed with passage(s) for blocking these apertures or establishing a communication between certain apertures according to service positions of the key during a rotation of the key, the cock including in another area of the housing, indexing means in order to tactilely tell the operator that the key has arrived in a service position where it establishes a communication, these indexing means comprising stubs and notches distributed over the faces facing the key and the housing so that during a rotation of the key, the stubs penetrate the notches when the key arrives in a service position and may only emerge therefrom when a substantial force is exerted on the key to rotate it, the key or the barrel being designed in order to allow the stubs to emerge from the notches by an elastic effect resulting from this force, the housing including a closed base which has a raised element determining between it and the side wall of the housing, an annular groove, the key having at its end a ring which rotates in this groove, the stubs and the notches being formed on said raised element and said ring, said ring comprising arc sectors which are separated by cuts and in which stubs or notches are formed, and being elastically deformable in a plane transverse to the axis of rotation of the key, the area where the indexing means are found, having a reduced diameter relative to the area into which said apertures open.

9. The cock according to claim 8, wherein said ring comprises two identical sectors each of which includes a stub.

10. The cock according to claim 9, wherein said raised element comprises eight notches.

11. The cock according to claim 8, wherein said ring comprises four identical sectors each of which includes a stub.

12. The cock according to claim 11, wherein said raised element comprises eight notches.

13. The cock according to claim 8, wherein the area where the indexing means are found has a reduced diameter relative to the area into which said apertures open.

14. The cock according to claim 8, wherein the housing has a cross-section which decreases from said end of the housing, and the key has a substantially frustro-conical shape.

15. The cock according to claim 8, wherein said raised element has a regular profile comprising a succession of convex sectors alternating with concave sectors forming said notches.

16. The cock according to claim 8, wherein the key comprises an annular rib disposed in a groove formed in the side wall of the housing for preventing axial movement between the key and the housing.

17. The cock according to claim 8, wherein the ring has a cross-section which is circular in an undeformed state and which becomes elliptical in an elastically deformed state.

18. The cock according to claim 8, wherein, when the ring is elastically deformed, a play exists between the convexities of the raised element and the ring and a play exists between the ring and the wall of the housing of the barrel which is facing the ring.

* * * * *